United States Patent
Messmer et al.

(10) Patent No.: US 8,959,517 B2
(45) Date of Patent: Feb. 17, 2015

(54) CANCELLATION MECHANISM FOR CANCELLABLE TASKS INCLUDING STOLEN TASK AND DESCENDENT OF STOLEN TASKS FROM THE CANCELLABLE TASKGROUP

(75) Inventors: William R. Messmer, Woodinville, WA (US); David Callahan, Seattle, WA (US); Paul F. Ringseth, Bellevue, WA (US); Niklas Gustafsson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 628 days.

(21) Appl. No.: 12/481,770

(22) Filed: Jun. 10, 2009

(65) Prior Publication Data

US 2010/0318995 A1 Dec. 16, 2010

(51) Int. Cl.
*G06F 9/46* (2006.01)
*G06F 9/48* (2006.01)

(52) U.S. Cl.
CPC ............ *G06F 9/4881* (2013.01); *G06F 9/4843* (2013.01); *G06F 9/46* (2013.01); *G06F 9/461* (2013.01)
USPC ........... 718/102; 718/105; 718/107; 718/108; 712/220

(58) Field of Classification Search
CPC ......... G06F 9/46; G06F 9/461; G06F 9/4881; G06F 9/4883; G06F 9/4843; G06F 9/3851; G06F 9/485
USPC ..................... 718/1, 102, 105, 106, 108, 107; 712/220
See application file for complete search history.

(56) References Cited

U.S. PATENT DOCUMENTS

| | | | | |
|---|---|---|---|---|
| 6,625,635 | B1 * | 9/2003 | Elnozahy ....................... | 718/102 |
| 6,633,897 | B1 * | 10/2003 | Browning et al. ............. | 718/103 |
| 6,993,765 | B2 * | 1/2006 | Suzuki et al. ................. | 718/102 |
| 7,159,217 | B2 * | 1/2007 | Pulsipher et al. ............. | 718/100 |
| 7,206,843 | B1 | 4/2007 | Allavarpu et al. | |
| 7,707,578 | B1 * | 4/2010 | Zedlewski et al. ............ | 718/102 |
| 7,784,051 | B2 * | 8/2010 | Mensing ....................... | 718/103 |
| 7,882,505 | B2 * | 2/2011 | Garthwaite et al. .......... | 718/104 |
| 8,087,031 | B2 * | 12/2011 | Violleau et al. ............... | 719/315 |
| 8,209,701 | B1 * | 6/2012 | Roytman et al. .............. | 718/106 |

(Continued)

OTHER PUBLICATIONS

Mei et al., Markov Clustering (MCL) based Thread Grouping and Thread Selection, Mar. 2009, IEEE, pp. 1-6.*

(Continued)

*Primary Examiner* — Mengyao Zhe
*Assistant Examiner* — Abu Ghaffari
(74) *Attorney, Agent, or Firm* — Kevin Sullivan; Raghu Chinagudabha; Mickey Minhas

(57) ABSTRACT

A scheduler in a process of a computer system schedules tasks of a task group for concurrent execution by multiple execution contexts. The scheduler provides a mechanism that allows the task group to be cancelled by an arbitrary execution context or an asynchronous error state. When a task group is cancelled, the scheduler sets a cancel indicator in each execution context that is executing tasks corresponding to the cancelled task group and performs a cancellation process on each of the execution contexts where a cancel indicator is set. The scheduler also creates local aliases to allow task groups to be used without synchronization by execution contexts that are not directly bound to the task groups.

17 Claims, 10 Drawing Sheets

(56) References Cited

U.S. PATENT DOCUMENTS

| | | | | |
|---|---|---|---|---|
| 2001/0034751 | A1* | 10/2001 | Eto et al. | 709/100 |
| 2003/0097395 | A1 | 5/2003 | Petersen | |
| 2006/0230409 | A1 | 10/2006 | Frigo et al. | |
| 2006/0256797 | A1* | 11/2006 | Bernabeu-Auban et al. | 370/395.31 |
| 2007/0256075 | A1* | 11/2007 | Denis | 718/102 |
| 2009/0178054 | A1* | 7/2009 | Chen et al. | 718/106 |
| 2010/0281483 | A1* | 11/2010 | Rakib et al. | 718/102 |

OTHER PUBLICATIONS

Regehr et al., Evolving real-time systems using hierarchical scheduling and concurrency analysis, 2003, IEEE, pp. 1-12.*

Blochinger, et al. "Parallel Propositional Satisfiability Checking with Distributed Dynamic Learning", Retrieved at<<http://216.239.59.104/search?q=cache:eoeXsY295AoJ:www.carstensinz.de/papers/ParComp-2003.pdf+cilk+task+group+%22thread+cancellation%22&hl=en&ct=clnk&cd=4, Jul. 28, 2001, pp. 21.

"Exception Handling and Cancellation in TBB—Part III—Use Cases with Nested Parallelism", Retrieved at<<http://softwareblogs.intel.com/2008/06/04/exception-handling-and-cancellation-in-tbb-part-iii-use-cases-with-nested-parallelism/>>, pp. 5.

Sub, et al. "Implementing Irregular Parallel Algorithms with Open MP", Retrieved at<<http://www.michaelsuess.net/publications/suess_leopold_irregular_para_06.pdf>>, pp. 10.

"Enable Safe, Scalable Parallelism with Intel Threading Building Block's Concurrent Containers (cont'd)", Retrieved at<<http://www.devx.com/cplus/Article/3333410/page/2, pp. 5.

Bethel, et al. "Hierarchical Parallelism in a Scene Graph", Retrieved at<<http://www.r3vis.com/Downloads/hpsg-2001.pdf>>, Submitted to the 2001 IEEE Symposium on Parallel and Large-Data Visualization and Graphics (PVG 2001), pp. 9.

* cited by examiner

CANCELLATION MECHANISM FOR CANCELLABLE TASKS INCLUDING STOLEN TASK AND DESCENDENT OF STOLEN TASKS FROM THE CANCELLABLE TASKGROUP

BACKGROUND

Processes executed in a computer system may include execution context schedulers that schedule tasks of processes for execution in the computer system. A scheduler may create execution contexts (e.g., threads, fibers, or child processes) in order to execute tasks. During execution, the scheduler maintains control over these execution contexts and maintains control of the processing resources allocated to the scheduler.

The scheduler may allow the process to express parallelism so that different parts of the process may be executed concurrently. In doing so, however, the scheduler may limit the ability of the process to control the execution. For example, the scheduler may make it difficult for the process to cancel concurrently executing parts of the process. In addition, the scheduler may place restrictions on which execution contexts can execute or control concurrently executing parts of the process.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A scheduler in a process of a computer system schedules tasks of a task group for concurrent execution by multiple execution contexts. The scheduler provides a mechanism that allows the task group to be cancelled by an arbitrary execution context or an asynchronous error state. When a task group is cancelled, the scheduler sets a cancel indicator in each execution context that is executing tasks corresponding to the cancelled task group and performs a cancellation process on each of the execution contexts where a cancel indicator is set. The scheduler also creates local aliases to allow task groups to be used without synchronization by execution contexts that are not directly bound to the task groups.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown, by way of illustration, specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
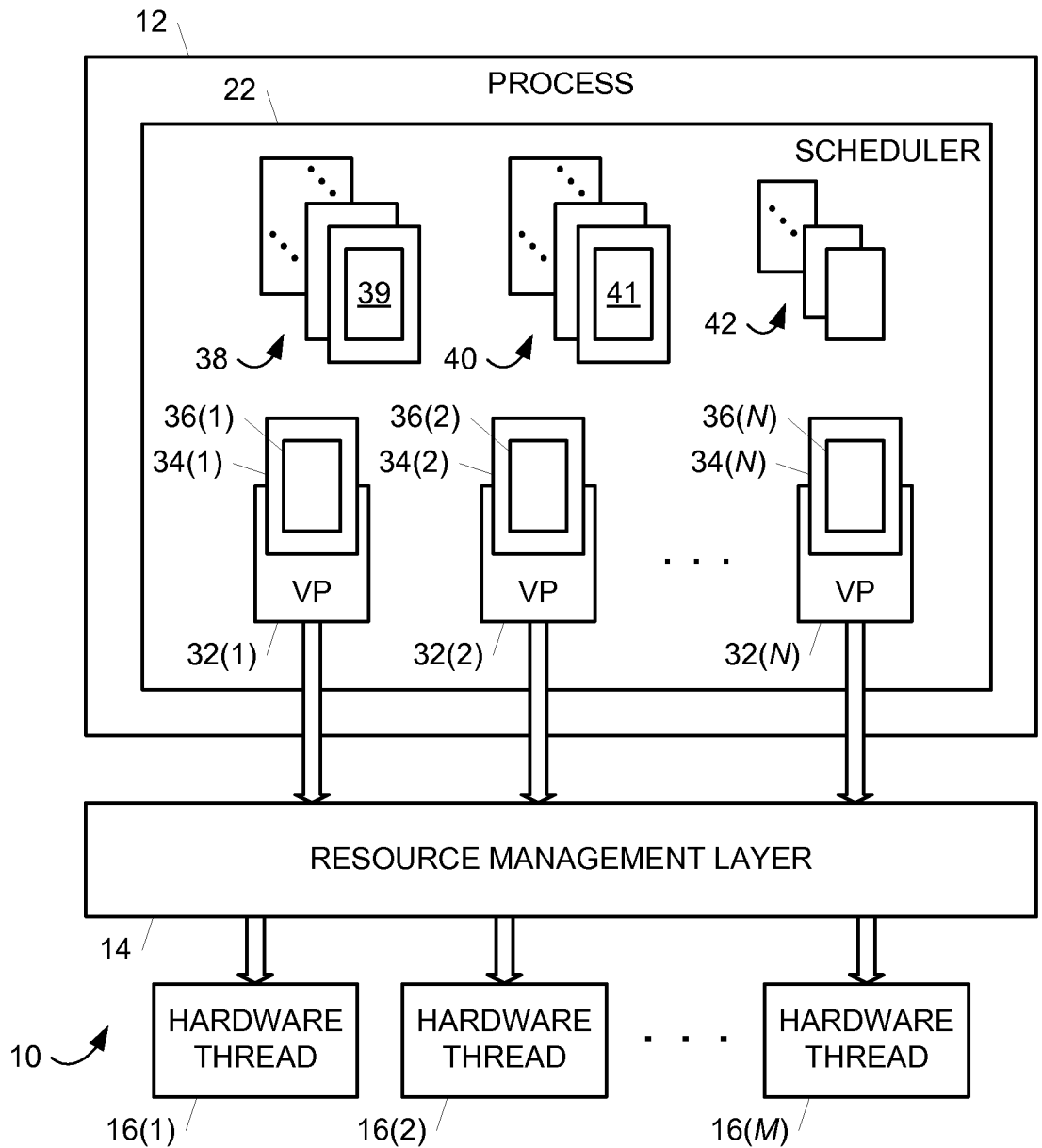
FIG. 1 is a block diagram illustrating an embodiment of a scheduler configured to schedule execution contexts for execution by processing resources.

FIG. 1 is a block diagram illustrating an embodiment of a scheduler 22 in a process 12 of a runtime environment 10. Scheduler 22 is configured to schedule execution contexts for execution by processing resources.

Runtime environment 10 represents a runtime mode of operation in a computer system, such as a computer system 100 shown in FIG. 11 and described in additional detail below, where the computer system is executing instructions. The computer system generates runtime environment 10 from a runtime platform such as a runtime platform 122 shown in FIG. 11 and described in additional detail below.

Runtime environment 10 includes an least one invoked process 12, a resource management layer 14, and a set of hardware threads 16(1)-16(M), where M is an integer that is greater than or equal to one and denotes the Mth hardware thread 16(M). Runtime environment 10 allows tasks from process 12 to be executed, along with tasks from any other processes that co-exist with process 12 (not shown), using an operating system (OS) such as an OS 120 shown in FIG. 11 and described in additional detail below, resource management layer 14, and hardware threads 16(1)-16(M). Runtime environment 10 operates in conjunction with the OS and/or resource management layer 14 to allow process 12 to obtain processor and other resources of the computer system (e.g., hardware threads 16(1)-16(M)).

Runtime environment 10 includes a scheduler function that generates scheduler 22. In one embodiment, the scheduler function is implemented as a scheduler application programming interface (API). In other embodiments, the scheduler function may be implemented using other suitable programming constructs. When invoked, the scheduler function creates scheduler 22 in process 12 where scheduler 22 operates to schedule tasks of process 12 for execution by one or more hardware threads 16(1)-16(M). Runtime environment 10 may exploit fine grained concurrency that application or library developers express in their programs (e.g., process 12) using accompanying tools that are aware of the facilities that the scheduler function provides.

Process 12 includes an allocation of processing and other resources that hosts one or more execution contexts (viz., threads, fibers, or child processes). Process 12 obtains access to the processing and other resources in the computer system (e.g., hardware threads 16(1)-16(M)) from the OS and/or resource management layer 14. Process 12 causes tasks to be executed using the processing and other resources.

Process 12 generates work in tasks of variable length where each task is associated with an execution context in scheduler 22. Each task includes a sequence of instructions that perform a unit of work when executed by the computer system. Each execution context forms a thread, fiber, or child process that executes associated tasks on allocated processing resources. Each execution context includes program state and machine state information. Execution contexts may terminate when there are no more tasks left to execute. For each task, runtime environment 10 and/or process 12 either assign the task to scheduler 22 to be scheduled for execution or otherwise cause the task to be executed without using scheduler 22.

Process 12 may be configured to operate in a computer system based on any suitable execution model, such as a stack model or an interpreter model, and may represent any suitable type of code, such as an application, a library function, or an operating system service. Process 12 has a program state and machine state associated with a set of allocated resources that include a defined memory address space. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

Resource management layer 14 allocates processing resources to process 12 by assigning one or more hardware threads 16 to process 12. Resource management layer 14 exists separately from the OS in the embodiment of FIG. 1. In other embodiments, resource management layer 14 or some or all of the functions thereof may be included in the OS.

Hardware threads 16 reside in execution cores of a set or one or more processor packages (e.g., processor packages 102 shown in FIG. 11 and described in additional detail below) of the computer system. Each hardware thread 16 is configured to execute instructions independently or substantially independently from the other execution cores and includes a machine state. Hardware threads 16 may be included in a single processor package or may be distributed across multiple processor packages. Each execution core in a processor package may include one or more hardware threads 16.

Process 12 implicitly or explicitly causes scheduler 22 to be created via the scheduler function provided by runtime environment 10. Scheduler instance 22 may be implicitly created when process 12 uses APIs available in the computer system or programming language features. In response to the API or programming language features, runtime environment 10 creates scheduler 22 with a default policy. To explicitly create a scheduler 22, process 12 may invoke the scheduler function provided by runtime environment 10 and specify one or more policies for scheduler 22.

Scheduler 22 interacts with resource management layer 14 to negotiate processing and other resources of the computer system in a manner that is transparent to process 12. Resource management layer 14 allocates hardware threads 16 to scheduler 22 based on supply and demand and any policies of scheduler 22.

In the embodiment shown in FIG. 1, scheduler 22 manages the processing resources by creating virtual processors 32 that form an abstraction of underlying hardware threads 16. Scheduler 22 includes a set of virtual processors 32(1)-32(N) where N is an integer greater than or equal to one and denotes the Nth virtual processor 32(N). Scheduler 22 multiplexes virtual processors 32 onto hardware threads 16 by mapping each virtual processor 32 to a hardware thread 16. Scheduler 22 may map more than one virtual processor 32 onto a particular hardware thread 16 but maps only one hardware thread 16 to each virtual processor 32. In other embodiments, scheduler 22 manages processing resources in other suitable ways to cause instructions of process 12 to be executed by hardware threads 16.

The set of execution contexts in scheduler 22 includes a set of execution contexts 34(1)-34(N) with respective, associated tasks 36(1)-36(N) that are being executed by respective virtual processors 32(1)-32(N) and, at any point during the execution of process 12, a set of zero or more runnable execution contexts 38 and a set of zero or more blocked (i.e., wait-dependent) execution contexts 40. Each execution context 34, 38, and 40 includes state information that indicates whether an execution context 34, 38, or 40 is executing, runnable (e.g., in response to becoming unblocked or added to scheduler 22), or blocked. Execution contexts 34 that are executing have been attached to a virtual processor 32 and are currently executing. Execution contexts 38 that are runnable include an associated task 39 and are ready to be executed by an available virtual processor 32. Execution contexts 40 that are blocked also include an associated task 41 and are waiting for data, a message, or an event that is being generated by another execution context 34 or will be generated by another execution context 38 or 40.

Each execution context 34 executing on a virtual processor 32 may generate, in the course of its execution, additional tasks 42, which are organized in any suitable way (e.g., added to work queues (not shown in FIG. 1)). Work may be created by using either application programming interfaces (APIs) provided by runtime environment 10 or programming language features and corresponding tools in one embodiment. When processing resources are available to scheduler 22, tasks are assigned to execution contexts 34 or 38 that execute them to completion on virtual processors 32 before picking up new tasks. An execution context 34 executing on a virtual processor 32 may also unblock other execution contexts 40 by generating data, a message, or an event that will be used by other execution contexts 40.

Each task in scheduler 22 may be realized (e.g., realized tasks 36 and 39), which indicates that an execution context 34 or 38 has been or will be attached to the task and the task is ready to execute. Realized tasks typically include lightweight tasks and agents and may be associated with an execution context 34 or 38 just before executing or in advance of execution. A task that is not realized is termed unrealized. Unrealized tasks (e.g., tasks 42) may be created as child tasks generated by the execution of parent tasks and may be generated by parallel constructs (e.g., parallel or parallel for) or included in task groups 60 (shown in FIGS. 2A, 6A, 9, and 10). Scheduler 22 may be organized into a synchronized collection (e.g., a stack and/or a queue) for logically independent tasks with execution contexts (i.e., realized tasks) along with a list of worksteaing queues for dependent tasks (i.e., unrealized tasks).

Prior to executing tasks, scheduler 22 obtains execution contexts 34, 38, and 40 from runtime environment 10, resource management layer 14, or the operating system. Available virtual processors 32 locate and execute execution contexts 34 to begin executing tasks. Virtual processors 32 become available again in response to an execution context 34 completing, blocking, or otherwise being interrupted (e.g., explicit yielding or forced preemption). When virtual processors 32 become available, the available virtual processor 32 may switch to a runnable execution context 38 to execute an associated task 39. The available virtual processor 32 may also execute a next task 39 or 42 as a continuation on a current execution context 34 if the previous task 36 executed by the current execution context 34 completed.

Scheduler 22 searches for a runnable execution context 38, a realized task 39, or an unrealized task 42 to attach to the available virtual processor 32 for execution in any suitable way. For example, scheduler 22 may search for a runnable execution context 38 to execute before searching for a realized task 39 or an unrealized task 42 to execute. Scheduler 22 continues attaching execution contexts 38 to available virtual processors 32 for execution until all tasks and execution contexts 38 of scheduler 22 have been executed. In other embodiments, runnable execution contexts 38 and realized tasks 39 may be merged into single concept from the perspective of schedulers 22.

Figure 2A:
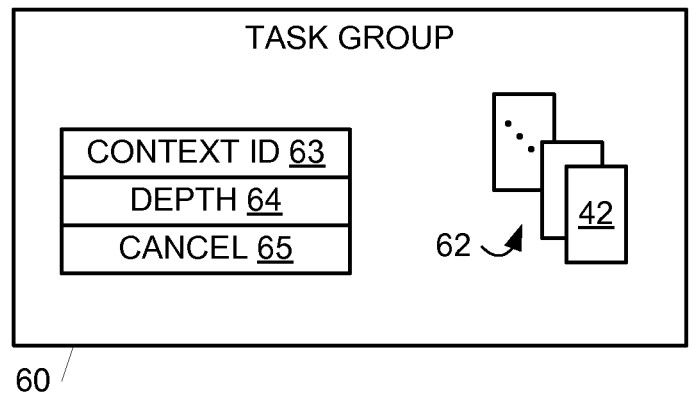
FIGS. 2A-2B are block diagrams illustrating embodiments of data structures used to allow task groups to be cancelled.
Figure 6A:
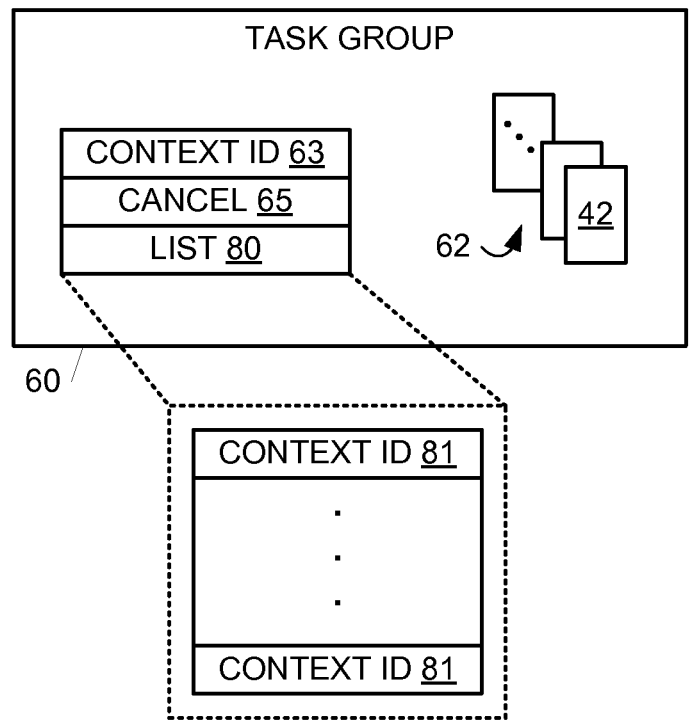
FIGS. 6A-6B are block diagrams illustrating embodiments of data structures used to allow task groups to be cancelled.

In one embodiment, process 12 organizes unrealized tasks 42 into one or more task groups 60 as shown in FIGS. 2A and 6A. Each task group 60 includes a set 62 of one or more unrealized tasks 42 that are suitable for concurrent execution by available execution contexts 34 and 38 on virtual processors 32. Each task group 60 may be generated using an API or other suitable programming construct that sets forth the set 62 of unrealized tasks 42. The tasks 42 may be executed inline by the execution context 34 that created the task group 60 and/or may be stolen by any available virtual processors 32 in scheduler 22. Each task group 60 may be used to form a fork and join pattern where the set 62 of tasks 42 may be forked out to multiple virtual processors 32 for execution and subsequently joined by a virtual processor 32 before proceeding. In addition, each task 42 may generate additional task groups 60 to create depths of task groups 60 in execution contexts 34.

Scheduler 22 is configured to allow task groups 60 to be arbitrarily cancelled by any execution context 34 or in response to asynchronous error state. An execution context 34 that cancels a task group 60 may or may not be executing a task 42 from the task group 60 or a task descended from a task 42 of the task group 60. In response to an asynchronous error state, scheduler 22 may initiate the cancellation of one or more task groups 60. Scheduler 22 may do so for error states that meet any suitable predefined conditions such as an exception that flows through a task 42 from a task group 60 without being caught by the task 42.

Scheduler 22 binds each task group 60 to an execution context 34 that created the task group 60 by storing a context identifier 63 with each task group 60 that identifies the bound execution context 34 as shown in FIGS. 2A and 6A. In the embodiment of FIG. 2A, scheduler 22 also stores a depth indicator 64 to indicate the task group depth of the task group 60 in the bound execution context 34. Scheduler 22 also stores a cancel indicator 65 with each task group 60 that may be set by an arbitrary execution context 34 to indicate that the task group 60 has been cancelled.

Figure 2B:
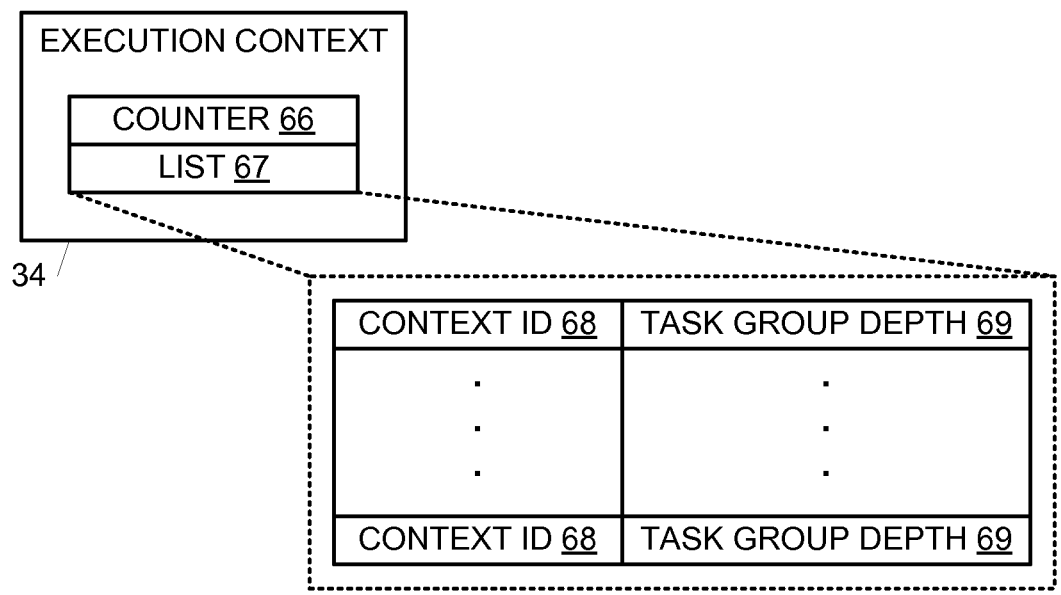

FIG. 2B is a block diagram illustrating an embodiment of an execution context data structure used to allow task groups 60 to be cancelled. In this embodiment, each execution context 34 maintains a counter 66 that functions as a cancel indicator to indicate that one or more task groups 60 corresponding to the execution context 34 have been cancelled. Counter 66 is incremented each time that a task group 60 corresponding to the execution context 34 is cancelled. An execution context 34 corresponds to a task group 60 if the execution context 34 is bound to the task group 60, is executing or blocked on a task 42 stolen from the task group 60, or is executing or blocked on a task 42 descended from a task 42 stolen from the task group 60. In the bound execution context 34, counter 66 is decremented when the cancelled task group 60 is identified and cancelled by scheduler 22 during the cancellation process. In other non-bound execution contexts 34, counter 66 is decremented when the entry point of the execution context 34 is reached during the cancellation process. In some embodiments, each execution context 34 also maintains a depth indicator (not shown) to indicate the task group depth of a cancelled task group 60.

In the embodiment of FIG. 2B, each execution context 34 maintains a list 67 of execution contexts 34 that stole tasks 42 from task groups 60 bound to the execution context 34 along with the depths in the bound execution context 34 from which tasks 42 where stolen. Scheduler 22 adds each execution context 34 that steals a task 42 from a task group 60 to the list 67 of the bound execution context 34. In each list 67, a context identifier 68 identifies a stealing execution context 34 and a task group depth indicator 69 that indicates the depth of the task group 60 in the bound execution context 34 from which the task 42 was stolen.

The process of cancelling a task group 60 using the embodiments of FIGS. 2A-2B will now be described with reference to embodiments of methods for cancelling task groups 60 shown in FIGS. 3A-3B. The embodiments of FIGS. 3A-3B will also be described with reference to an example of a runtime environment 10A executing tasks 42 from task groups 60 shown in FIG. 4.

Figure 3A:
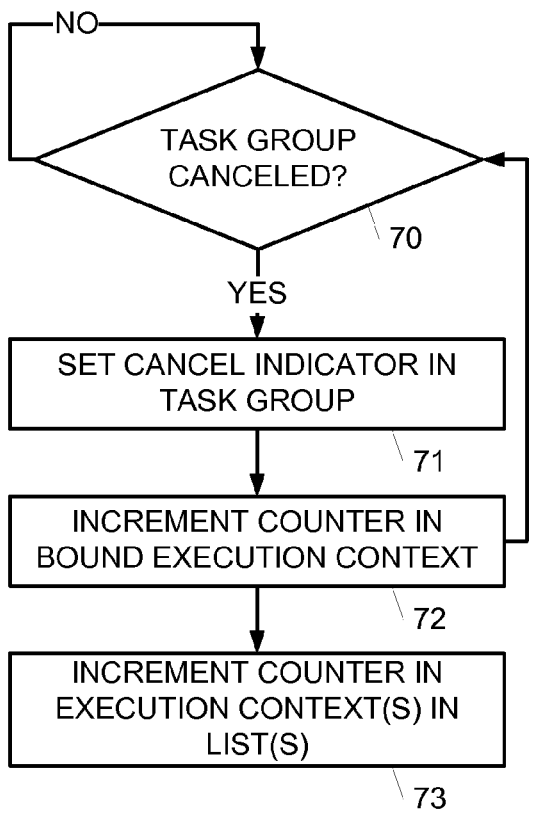
FIGS. 3A-3B are flow charts illustrating embodiments of methods for cancelling task groups.

FIG. 3A is a flow chart illustrating an embodiment of a method for identifying execution contexts 34 that are executing inline or stolen tasks 42 from a cancelled task group 60 or tasks 42 that descended from tasks 42 of the cancelled task group 60. In FIG. 3A, a determination is made as to whether a task group 60 is cancelled as indicated in a block 70. An execution context 34 may cancel a task group 60 using an API or other suitable programming construct that identifies the task group 60 to be cancelled to scheduler 22.

Any time that an execution context 34 or an asynchronous error state cancels a task group 60, scheduler 22 sets the cancel indicator 65 in the corresponding task group 60 to indicate that the task group 60 is cancelled as indicated in a block 71. Scheduler 22 also increments the counter 66 in the bound execution context 34 as indicated in a block 72. Scheduler 22 identifies the bound execution context 34 using context ID 63 in the cancelled task group 60.

Scheduler 22 further increments the counter 66 in each execution context 34 that is executing or blocked on a stolen task 42 from the cancelled task group 60 or any task 42 descended from a stolen task 42 from the cancelled task group 60 using lists 67, potentially recursively, as indicated in a block 73. Scheduler 22 first accesses the list 67 in the bound execution context 34 to identify execution contexts 34 that stole tasks 42 from the cancelled task group 60. Scheduler 22 increments the counter 66 in each execution context 34 that is identified by a context ID 68 in list 67 if the corresponding depth indicator 69 is greater than or equal to the depth indicator 64 of the cancelled task group 60. By doing so, scheduler 22 begins the process of cancelling the stolen tasks 42 of the cancelled task group 60 as well as any tasks 42 created by (i.e., descended from) the stolen tasks 42 in the execution contexts 34 whose counters 66 have been incremented.

As noted above, stolen tasks 42 may create additional task groups 60 with tasks 42 that may be further stolen by other execution contexts 34. To cancel these additional stolen tasks 42 as well as any tasks 42 descended there from, scheduler 22 accesses the list 67 in each execution context 34 where stolen tasks 42 are being cancelled (i.e., where counter 66 has been incremented by scheduler 22) and increments the counter 66 in each execution context 34 that is identified by a context ID 68 in each list 67 from execution contexts 34 where stolen tasks 42 are being cancelled. Scheduler 22 continues this recursive process of accessing lists 67 and incrementing counters 66 until all execution contexts 34 that are executing tasks 42 descended from stolen tasks from the cancelled task group 60 have had their corresponding counters 66 incremented.

Figure 4:
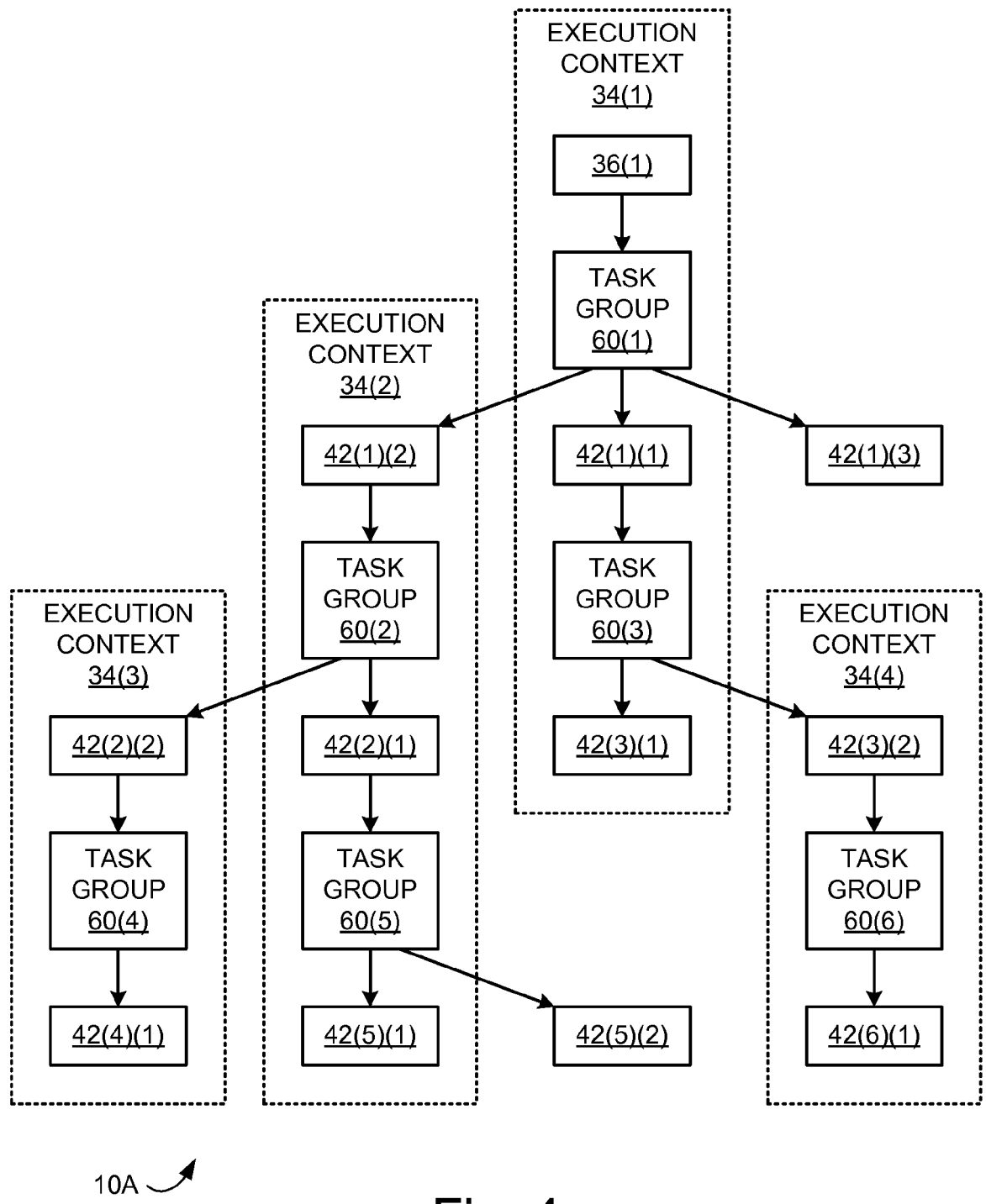
FIG. 4 is a block diagram illustrating an embodiment of a runtime environment executing task groups.

In the example of FIG. 4, execution context 34(1) executed task 36(1) to create task group 60(1) with tasks 42(1)(1)-42(1)(3). Execution context 34(1) executed task 42(1)(1) inline to create task group 60(3) with tasks 42(3)(1)-42(3)(2), and then executed 42(3)(1) inline. Execution context 34(2) stole task 42(1)(2) and executed task 42(1)(2) to create task group 60(2) with tasks 42(2)(1)-42(2)(2). Execution context 34(2) then executed task 42(2)(1) inline to create task group 60(5) with tasks 42(5)(1)-42(5)(2) and executed task 42(5)(1) inline. Execution context 34(3) stole task 42(2)(2), executed task 42(2)(2) to create task group 60(4) with task 42(4)(1), and executed task 42(4)(1) inline. Execution context 34(4) stole task 42(3)(2), executed task 42(3)(2) to create task group 60(6) with tasks 42(6)(1)-42(6)(2), and executed task 42(6)(1) inline. Tasks 42(1)(3) and 42(5)(2) are waiting to be picked up for execution.

If task group 60(1) is cancelled, scheduler 22 sets the cancel indicator 65 in the task group 60(1) and increments the counter 66 in the bound execution context 34(1). Scheduler 22 also accesses list 67 of execution context 34(1) which indicates that execution contexts 34(2) and 34(4) have stolen tasks from task groups 60 that are at or below the depth of the cancelled task group 60(1). Accordingly, scheduler 22 increments the counters 66 in the execution contexts 34(2) and 34(4). Scheduler 22 further accesses lists 67 of execution contexts 34(2) and 34(4). Because the list 67 of execution context 34(2) indicates that execution contexts 34(3) stole a task (i.e., task 42(2)(2)) from a task group 60 of execution context 34(2), scheduler 22 also increments the counter 66 in execution context 34(3). In this example, scheduler 22 increments the counters 66 in all execution contexts 34(1)-34(4) to cause tasks 42(1)(1)-42(1)(3) from task group 60(1) and all descendent tasks 42 to be cancelled.

Figure 3B:
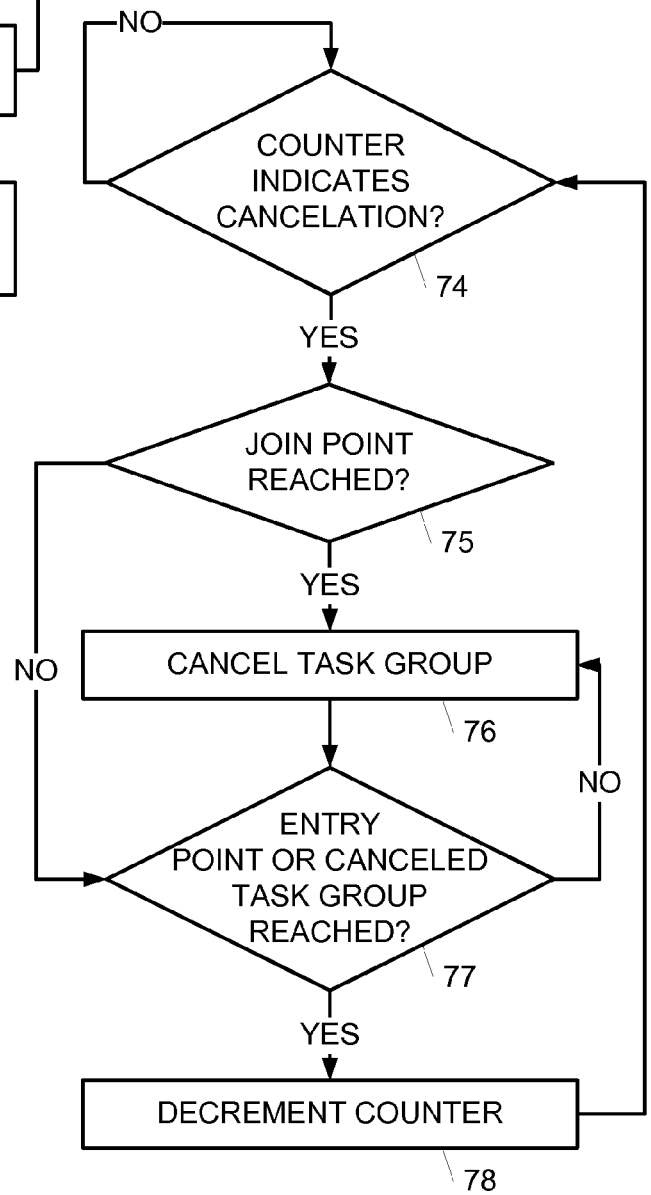

FIG. 3B is a flow chart illustrating an embodiment of a method for cancelling tasks 42 corresponding to a cancelled task group 60. The method shown in FIG. 3B is performed by scheduler 22 for each execution context 34 when an execution context 34 interacts with scheduler 22 in an interruptible way (e.g., the execution context 34 tries to fork or join, etc.).

In FIG. 3B, scheduler 22 determines whether a counter 66 of an execution context 34 indicates a cancellation of a task group 60 as indicated in a block 74. If the counter 66 is non-zero (i.e., the counter 66 has been incremented by scheduler 22 to indicate a cancellation as described above), then scheduler 22 initiates the cancellation of tasks 42 of the cancelled task group 60 and/or tasks 42 descended from a task 42 of the cancelled task group 60 in the execution context 34. To do so, scheduler 22 throws an exception in the execution context 34 that propagates up through the tasks 42 of the execution context 34 until the exception reaches a join point or an entry point of the execution context 34. If the exception reaches a join point as indicated in a block 75, scheduler 22 causes the task group 60 corresponding to the join point to be cancelled as indicated in a block 76. Scheduler 22 cancels the execution of the inline task 42 and any unexecuted tasks 42 of the task group 60.

Scheduler 22 determines whether an entry point of the execution context 34 or the cancelled task group 60 has been reached as indicated in a block 77. If scheduler 22 cancelled a task group 60 in block 76, scheduler 22 accesses the cancel indicator 65 of the task group 60 to determine whether the task group 60 is the one that was explicitly cancelled. If the cancel indicator 65 indicates that the task group 60 was the one that was explicitly cancelled, then scheduler 22 decrements the counter 66 of the execution context 34 as indicated in a block 78 and repeats the function of block 74. If the cancel indicator 65 does not indicate that the task group 60 was the one that was explicitly cancelled, then scheduler 22 re-throws the exception and repeats the function of block 75 for the next task group 60. If scheduler 22 did not cancel a task group 60 in block 76, then the exception has reached an entry point of the execution context 34. In this case, scheduler 22 decrements the counter 66 of the execution context 34 as indicated in block 78 and repeats the function of block 74.

In the example of FIG. 4 where task group 60(1) is cancelled as described above with reference to FIG. 3A, scheduler 22 detects that the counters 66 of each execution context 34(1)-34(4) are non-zero when each execution context 34(1)-34(4) interacts with scheduler 22 in an interruptible way.

When scheduler 22 detects that the counter 66 of execution context 34(1) indicates that a task group 60 corresponding to execution context 34(1) has been cancelled, scheduler 22 throws an exception in execution context 34(1). Because execution context 34(1) is executing task 42(3)(1) inline, task group 60(3) catches the exception. Scheduler 22 cancels the execution of the inline task 42(3)(1) and task group 60(3). Scheduler 22 accesses the cancel indicator 65 of task group 60(3) which indicates that task group 60(3) was not explicitly cancelled. Thus, scheduler 22 re-throws the exception in execution context 34(1) which is caught by task group 60(1) because execution context 34(1) is executing task 42(1)(1) inline. Scheduler 22 cancels the execution of the inline task 42(1)(1), unexecuted task 42(1)(3), and task group 60(1). Scheduler 22 accesses the cancel indicator 65 of task group 60(1) which indicates that task group 60(1) was explicitly cancelled and, as a result, decrements the counter 66 of execution context 34(1). Because the counter 66 of execution context 34(1) is now zero in this example, scheduler 22 halts the cancellation process in execution context 34(1) and makes execution context 34(1) available to execute new tasks.

When scheduler 22 detects that the counter 66 of execution context 34(2) is non-zero, scheduler 22 throws an exception in execution context 34(2). Task group 60(5) first catches the exception and scheduler 22 cancels the execution of the inline task 42(5)(1), unexecuted task 42(5)(2), and task group 60(5). Scheduler 22 re-throws the exception in execution context 34(2) which is caught by task group 60(2). Scheduler 22 cancels the execution of the inline task 42(2)(1) and task group 60(2) and again re-throws the exception. This time, the exception reaches the entry point of execution context 34(2) because task 42(1)(2) is executed as a stolen task and not an inline task. Scheduler 22 decrements the counter 66 of execution context 34(2) and, because the counter 66 is now zero, scheduler 22 halts the cancellation process in execution context 34(2) and makes execution context 34(2) available to execute new tasks.

Scheduler 22 handles the cancellation process of execution contexts 34(3) and 34(4) as described for execution context 34(2).

In the above embodiments, scheduler 22 may prevent execution contexts 34 from stealing tasks 42 from cancelled task groups 60 (i.e., task groups 60 with cancel indicators 65 set to indicate that the task groups are cancelled). Accordingly, scheduler 22 may prevent contention between work stealing and cancellation processes.

Figure 5:
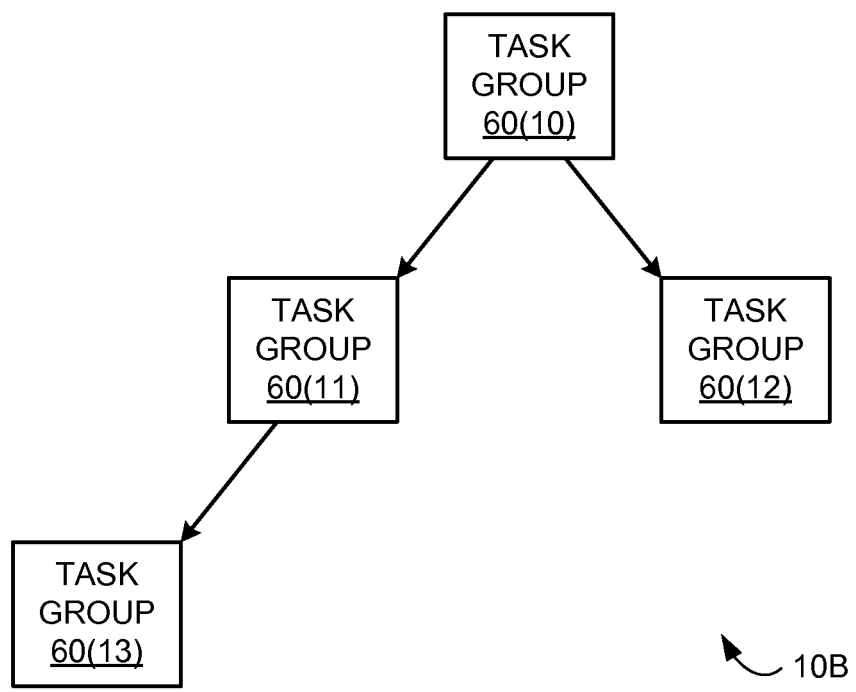
FIG. 5 is a block diagram illustrating an embodiment of a runtime environment executing task groups.

FIG. 5 is a block diagram illustrating an embodiment of a runtime environment 10B executing task groups 60(10)-60(13) where tasks 42 of task group 60(10) create task groups 60(11) and 60(12) and a task 42 of task group 60(11) creates task groups 60(13). Scheduler 22 uses counters 66 in the embodiments described above to allow an execution context 34 to discretely cancel any of task groups 60(10)-60(13) without cancelling any task groups 60 above the cancelled task group 60.

For example, at least counter 66 in the bound execution context 34 of task group 60(13) will be incremented if task group 60(13) is cancelled. Assuming that neither of task groups 60(10) or 60(11) are also cancelled, scheduler 22 will stop the cancellation process when the counter 66 in the bound execution context 34 is decremented to zero upon cancelling task group 60(13). If, however, one or both of task groups 60(10) or 60(11) are also cancelled, scheduler 22 will detect that the counter 66 in the bound execution context 34 is non-zero after being decremented zero upon cancelling task group 60(13). Accordingly, scheduler 22 will continue the cancellation process into task group 60(11) and, if task group 60(10) is cancelled, into task groups 60(10) and 60(12).

In the embodiments described above with reference to FIGS. 2A-3B and 3A-3B, a list 67 in each execution context 34 was used to track other execution contexts 34 that stole tasks 42 from task groups 60. In another embodiment shown in FIGS. 6A-6B, the lists 67 in execution contexts 34 may be replaced with lists 80 in task groups 60 and the depth indicators 64 in each task group 60 may be omitted.

As shown in FIG. 6A, each task group 60 includes maintains a list 80 of execution contexts 34 that stole tasks 42 from the corresponding task group 60. Scheduler 22 adds each execution context 34 that steals a task 42 from a task group 60 to the list 80 in that task group 60. In each list 80, a context identifier 81 identifies each execution context 34 that stole a task 42 from a corresponding task group 60.

Figure 6B:
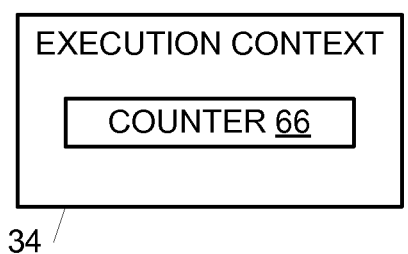

As shown in FIG. 6B, each execution context 34 maintains a counter 66 that indicates that one or more task groups 60 corresponding to the execution context 34 have been cancelled and is incremented and decremented as described above with reference to FIG. 2B.

The process of cancelling a task group 60 using the embodiments of FIGS. 6A-6B will now be described with reference to embodiments of methods for cancelling task groups 60 shown in FIGS. 7A-7B. The embodiments of FIGS. 7A-7B will also be described with reference to the example of FIG. 4.

Figure 7A:
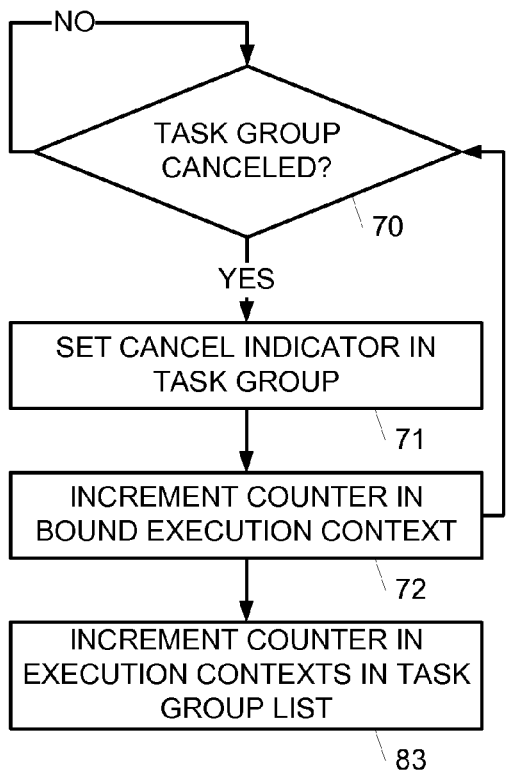
FIGS. 7A-7B are flow charts illustrating embodiments of methods for cancelling task groups.

FIG. 7A is a flow chart illustrating an embodiment of a method for identifying execution contexts 34 that are executing inline or stolen tasks 42 from a cancelled task group 60 or tasks 42 that descended from tasks 42 of the cancelled task group 60. In FIG. 7A, scheduler 22 performs the functions of blocks 70, 71, and 72 as described above with reference to FIG. 3A.

Scheduler 22 increments the counter 66 in each execution context 34 identified in the list 80 of the cancelled task group 60 as indicated in a block 83. Because list 80 includes execution contexts 34 that stole tasks 42 from the cancelled task group 60, scheduler 22 increments the counter 66 in each execution context 34 in list 80 to a non-zero value to initiate a cancellation process on the execution contexts 34. By doing so, scheduler 22 begins the process of cancelling the stolen tasks 42 of the cancelled task group 60.

Referring back to the example of FIG. 4 where task group 60(1) is cancelled, scheduler 22 sets the cancel indicator 65 in the task group 60(1) and increments the counter 66 in the bound execution context 34(1). Scheduler 22 also accesses list 80 of the cancelled task group 60(1) which indicates that execution context 34(2) has stolen a task from task group 60(1). Accordingly, scheduler 22 increments the counter 66 in the execution context 34(2). At this point, scheduler 22 does not know that execution contexts 34(3) and 34(4) are executing tasks 42 that descended from tasks 42 of the cancelled task group 60. The counters 66 for these execution contexts 34(3) and 34(4) will be set during the cancellation processes of execution contexts 34(2) and 34(1), respectively, as described below.

Figure 7B:
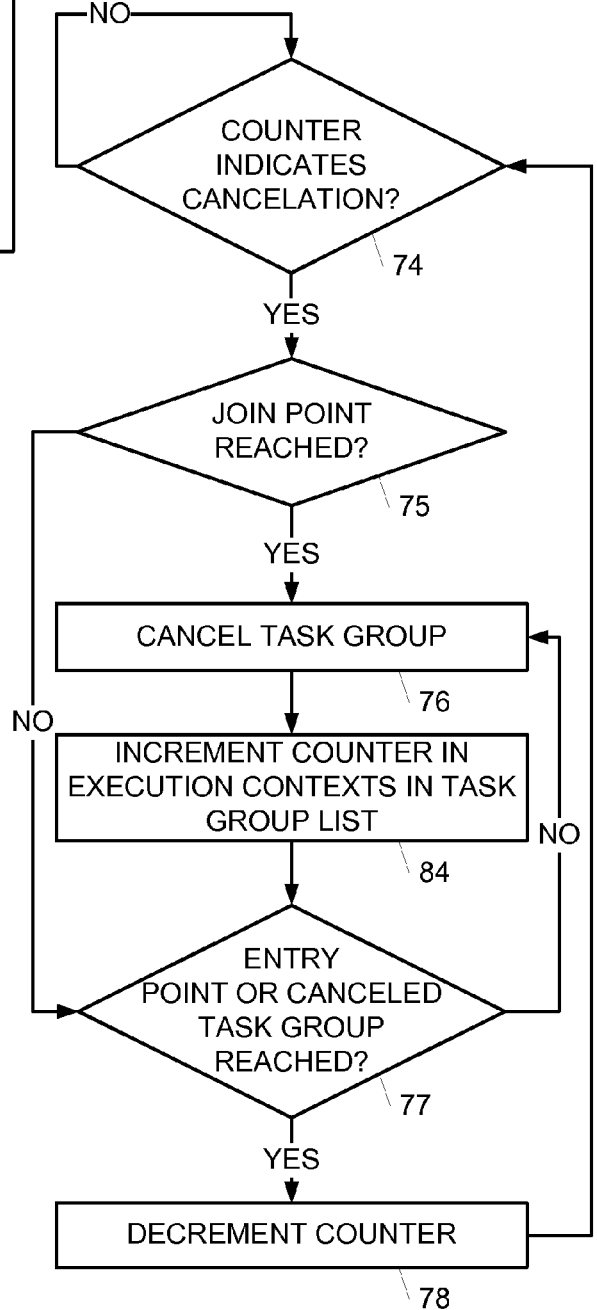

FIG. 7B is a flow chart illustrating an embodiment of a method for cancelling tasks 42 corresponding to a cancelled task group 60. The method shown in FIG. 7B is performed by scheduler 22 for each execution context 34 when an execution context 34 interacts with scheduler 22 in an interruptible way (e.g., the execution context 34 tries to fork or join, etc.).

In FIG. 7B, scheduler 22 performs the functions of blocks 74, 75, and 76 as described above with reference to FIG. 3B. For each task group 60 encountered, scheduler 22 accesses the list 80 of the task group 60 and increments the counter 66 in each execution context 34 identified in the list 80 of the encountered task group 60 as indicated in a block 84. Because list 80 includes execution contexts 34 that stole tasks 42 from the encountered task group 60, scheduler 22 increments the counter 66 in each execution context 34 in list 80 to a non-zero value to initiate a cancellation process on the execution contexts 34. By doing so, scheduler 22 begins the process of cancelling the stolen tasks 42 of the encountered task group 60. Scheduler 22 then performs the functions of blocks 77 and 78 described with reference to FIG. 3B above to continue and eventually complete the cancellation once the cancelled task group 60 or an entry point of the execution context 34 is encountered by the exception.

In the example of FIG. 4 where task group 60(1) is cancelled as described above with reference to FIG. 7A, scheduler 22 detects that the counters 66 of execution contexts 34(1) and 34(2) are non-zero when each execution context 34(1) and 34(2) interacts with scheduler 22 in an interruptible way.

In performing the cancellation process on execution context 34(1) as described above with reference to FIGS. 3B and 4, scheduler 22 accesses the list 80 of task group 60(3) and increments the counter 66 in execution context 34(4) which stole task 42(3)(2) from task group 60(3). Similarly, scheduler 22 accesses the list 80 of task group 60(2) and increments the counter 66 in execution context 34(3) which stole task 42(2)(2) from task group 60(2) in performing the cancellation process on execution context 34(2) as described above with reference to FIGS. 3B and 4. In this way, scheduler 22 begins the cancellation process on execution contexts 34(3) and 34(4).

In a further embodiment, the above embodiments may be partially combined such that execution contexts 34 include lists 67 as shown in FIG. 2B and task groups 60 include depth indicators 64 as shown in FIG. 2A and, in some cases, lists 80 as shown in FIG. 6A. A task group 60 may be created by a first execution context 34 and passed to a second execution context 34 in this embodiment. If the first execution context 34 exits, then the list 67 of the first execution context is moved to the task group 60 and stored as a list 80. Accordingly, the cancellation process uses lists 67 and lists 80, if present, to identify all task groups 60 to be cancelled.

In addition to being cancellable, task groups 60 may be used by different execution contexts 34 while maintaining thread safety between the execution contexts 34. In particular, arbitrary execution contexts 34 may add tasks 42 to task groups 60 that are bound to other execution contexts 34 and execute these added tasks 42 inline. Execution contexts 34 that use task groups 60 that are bound to other execution contexts 34 are referred to herein as non-bound execution contexts 34. Scheduler 22 creates and uses local aliases of task groups 60 that are used by non-bound execution contexts 34 to ensure thread safety as described with reference to the embodiments of FIGS. 8, 9, and 10.

Figure 8:
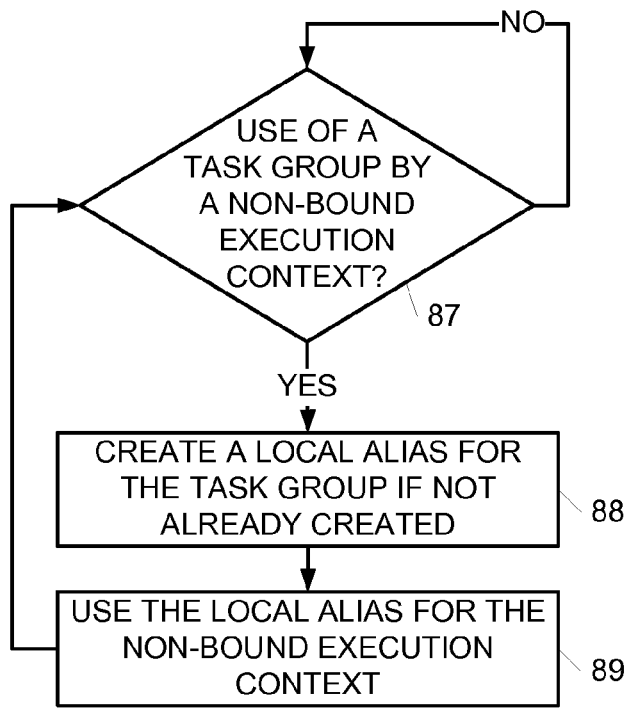
FIG. 8 is a flow chart illustrating an embodiment of a method for using task groups with non-bound execution contexts.

FIG. 8 is a flow chart illustrating an embodiment of a method for using task groups 60 with non-bound execution contexts 34. As shown in FIG. 8, any time that scheduler 22 detects the use of a task group 60 by a non-bound execution context 34 as indicated in a block 87, scheduler 22 creates a local alias for the task group 60 if one has not already been created as indicated by a block 88 and uses the local alias for the non-bound execution context 89. By doing so, scheduler 22 limits the access of non-bound execution contexts 34 to the task group 60 to maintain thread safety while allowing non-bound execution contexts 34 to use the task group 60.

Scheduler 22 creates either an indirect alias 90 (shown in FIG. 9) or a direct alias 94 (shown in FIG. 10) for each use of each task group 60 by a non-bound execution context 34.

Figure 9:
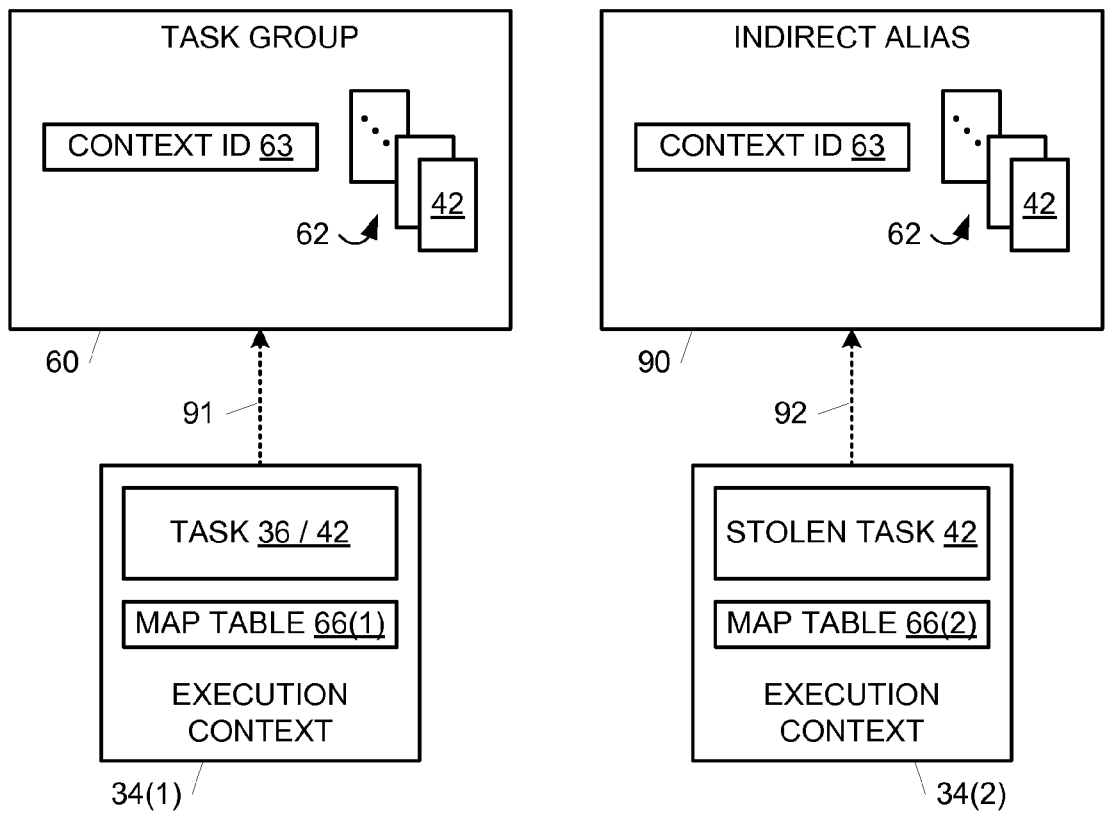
FIG. 9 is a block diagram illustrating an embodiment of data structures using task groups with non-bound execution contexts.

Scheduler 22 creates an indirect alias 90 any time that a non-bound execution context 34 is executing a task 42 stolen from a task group 60 and the stolen task 42 uses the task group 60 as illustrated in FIG. 9. In FIG. 9, execution context 34(1) executes a task 36 or 42 that creates a task group 60 with a set of tasks 42 as indicated by an arrow 91. Scheduler 22 binds the task group 60 to execution context 34(1) by storing an identifier of execution context 34(1) in context ID 63 of task group 60. Execution context 34(2) steals a task 42 from the set 62 in task group 60 and executes the stolen task 42. When scheduler 22 detects that the stolen task 42 attempts to use task group 60, scheduler 22 creates indirect alias 90 and stores an identifier of execution context 34(2) in a context ID 63 of indirect alias 90. Scheduler 22 also stores information in a map table 66(2) of execution context 34(2) that maps task group 60 to indirect alias 90. Scheduler 22 then allows only execution context 34(2) to use indirect alias 90.

Any time that execution context 34(2) attempts to use task group 60, execution context 34(2) detects that task group 60 maps to indirect alias 90 and uses indirect alias 90 instead of task group 60 as indicated by an arrow 92. Accordingly, execution context 34(2) adds a set 62 of one or more tasks 42 to the indirect alias 90 and may inline execute some or all of the tasks 42 from indirect alias 90. After the stolen task 42 finishes execution, execution context 34(2) performs a join operation on the indirect alias 90 and potentially inline executes any tasks 42 that were queued in the indirect alias 90 by the stolen task 42.

Because execution context 34(1) will not complete task group 60 until the stolen task 42 is completed, execution context 34(1) will not complete the join operation on task group 60 until all tasks 42 from the indirect alias 90 complete and the stolen task 42 performs a join operation on the indirect alias 90. As a result, the use of a task group 60 by non-bound execution context 34(2) is handled by wait transitivity where the bound execution context 34(1) waits until the stolen task 42 completes a join operation on the indirect alias 90 before completing a join operation on the task group 60.

Figure 10:
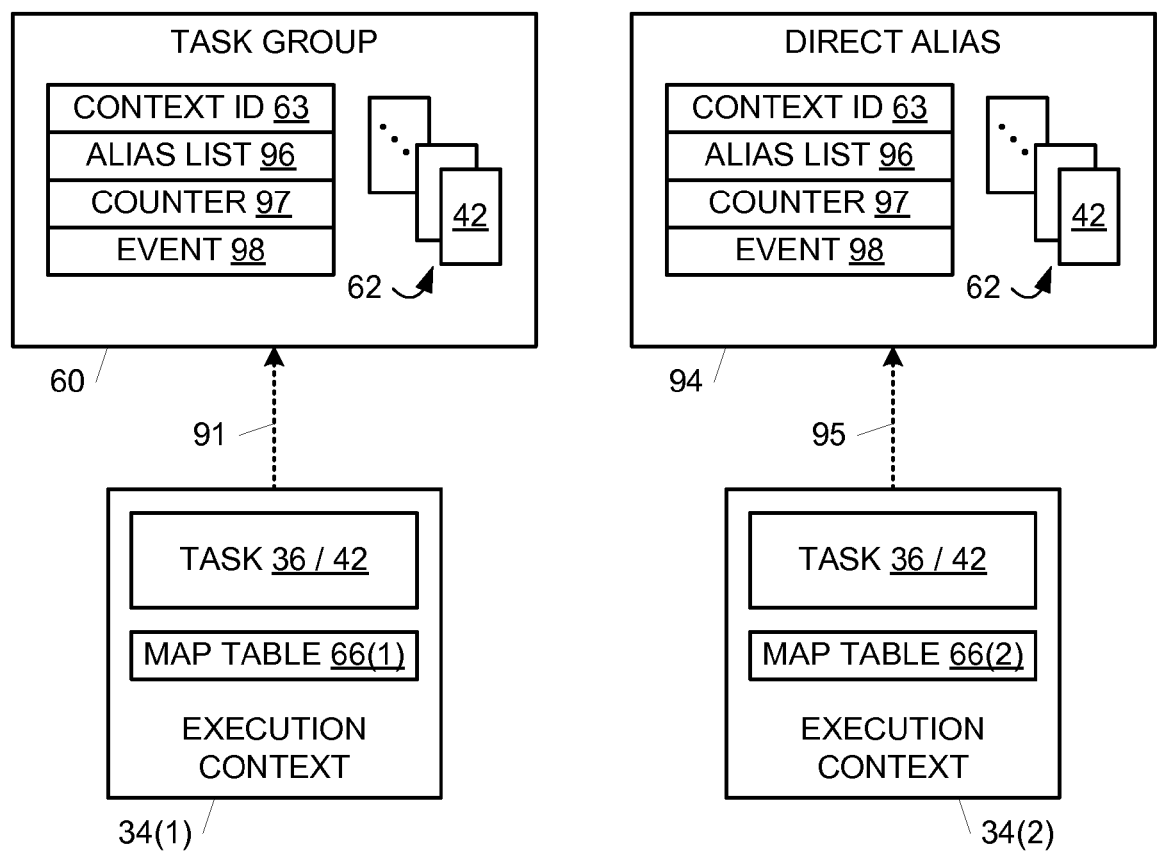
FIG. 10 is a block diagram illustrating an embodiment of data structures using task groups with non-bound execution contexts.

Referring to FIG. 10, scheduler 22 creates a direct alias 94 any time that a task group 60 is passed to an execution context 34 that is unrelated to a work tree that includes the task group 60 or passed to an execution context 34 two or more layers down a work tree that includes the task group 60. As in the embodiment of FIG. 9, execution context 34(1) executes a task 36 or 42 that creates a task group 60 with a set of tasks 42 as indicated by arrow 91 and scheduler 22 binds the task group 60 to execution context 34(1) using context ID 63 of task group 60. While executing a task 36 or 42, execution context 34(2) attempts to use task group 60. The task 36 or 42 of execution context 34(2) may be an arbitrary task 36 or 42 that is not descended from a stolen task 42 of task group 60 or may be a task 42 that is descended from a task 42 of task group 60. Scheduler 22 creates direct alias 94 in response to the attempt by execution context 34(2) to use task group 60 and adds the direct alias 94 to a lock-free linked list of direct aliases 94 (not shown) that point back to the task group 60. Scheduler 22 forms the linked list using alias list pointers 96 in each direct alias 94. Scheduler 22 also stores an identifier of execution context 34(2) in a context ID 63 of direct alias 94, stores information in a map table 66(2) of execution context 34(2) that maps task group 60 to direct alias 94, and allows only execution context 34(2) to use direct alias 94.

Any time that execution context 34(2) attempts to use task group 60, execution context 34(2) detects that task group 60 maps to direct alias 94 and uses direct alias 94 instead of task group 60 as indicated by an arrow 95. Accordingly, execution context 34(2) adds a set 62 of one or more tasks 42 to the direct alias 94 and may inline execute some or all of the tasks 42 from direct alias 94. Subsequent to the execution of all tasks 42 from the direct alias 94, execution context 34(2) may steal or attempt to steal tasks 42 from other direct aliases 94 before performing a join operation on the direct alias 94.

Task group 60 and direct alias 94 each include a counter 97 and an event indicator 98. Each counter 97 indicates the number of uncompleted tasks 42 in a corresponding task group 60 or direct alias 94. A counter 97 is incremented each time that a task 42 is added to a corresponding task group 60 or direct alias 94 and decremented each time that a task 42 of a corresponding task group 60 or direct alias 94 is completed. Each event indicators 98 is cleared any time that uncompleted tasks 42 are present in a corresponding task group 60 or direct alias 94 and set any time that uncompleted tasks 42 are not present in a corresponding task group 60 or direct alias 94.

When a join operation is performed on task group 60 by execution context 34(1), execution context 34(1) attempts to inline execute any tasks 42 that have not been stolen or completed in task group 60. After all tasks 42 of task group 60 have been stolen or completed, execution context 34(1) iterates through the linked list of direct aliases 94 and gathers the events in event indicators 98 in task group 60 and each direct alias 94. Execution context 34(1) then performs a wait-for-all on these events to wait until event indicators 98 are cleared to indicate that all tasks 42 of task group 60 and all direct aliases 94 have completed. Scheduler 22 (or other execution contexts 34) will eventually complete all of the tasks 42 and signal the events which will then allow the join operation in execution context 34(1) to proceed.

If the join operation for task group 60 is performed by execution context 34(2) or another non-bound execution context 34, then execution context 34(2) attempts to inline execute any tasks 42 that have not been stolen or completed in the direct alias 94. After all tasks 42 of the direct alias 94 have been stolen or completed, execution context 34(2) iterates through the linked list of direct aliases 94 and task group 60 and gathers the events in event indicators 98 in task group 60 and each direct alias 94. Execution context 34(2) then performs a wait-for-all on these events to wait until event indicators 98 are cleared to indicate that all tasks 42 of task group 60 and all direct aliases 94 have completed. Scheduler 22 (or other execution contexts 34) will eventually complete all of the tasks 42 and signal the events which will then allow the join operation in execution context 34(2) to proceed.

Indirect aliases 90 are inherently canceled in the cancellation process described above with reference to FIGS. 1-7B as follows. Because each indirect alias 90 was created subsequent to an execution context 34 stealing a task 42 from a task group 60, the execution context 34 that stole the task 42 appears in a list 67 for the embodiment of FIGS. 2A-3B or a list 80 for the embodiment of FIGS. 6A-7B. If the task group 60 is cancelled, then the stolen task 42 and any tasks and/or task groups 60 that descend from the stolen task 42 will be cancelled as part of the cancellation process for the task group 60 when the execution context 34 that stole the task 42 is identified using a list 67 or 80.

For direct aliases 94 in the cancellation process, scheduler 22 traverses the linked list of direct aliases indicated by map table 60 and cancels each direct alias 94 in each canceled task group 60 as follows. If an execution context 34 is executing a task 42 of a direct alias 94 inline, then scheduler 22 performs the cancellation as described above with reference to FIGS. 1-7B. If an execution context 34 is not executing a task 42 of the direct alias 94 inline, then scheduler 22 defers the cancellation of the execution context 34 until the execution context 34 attempts to execute a task 42 of the direct alias 94 inline. The scheduler 22 also cancels any tasks that descended from a task 42 of the direct alias 94 using the list or lists 67 for the embodiments of FIGS. 2A-3B or the list or lists 80 for the embodiment of FIGS. 6A-7B.

The above embodiments may provide scalable and efficient mechanisms for expressing parallel work constructs such as a fork and join pattern. The embodiments may allow for scalable usage on multiple execution contexts and cancellation at arbitrary levels of a work tree.

Figure 11:
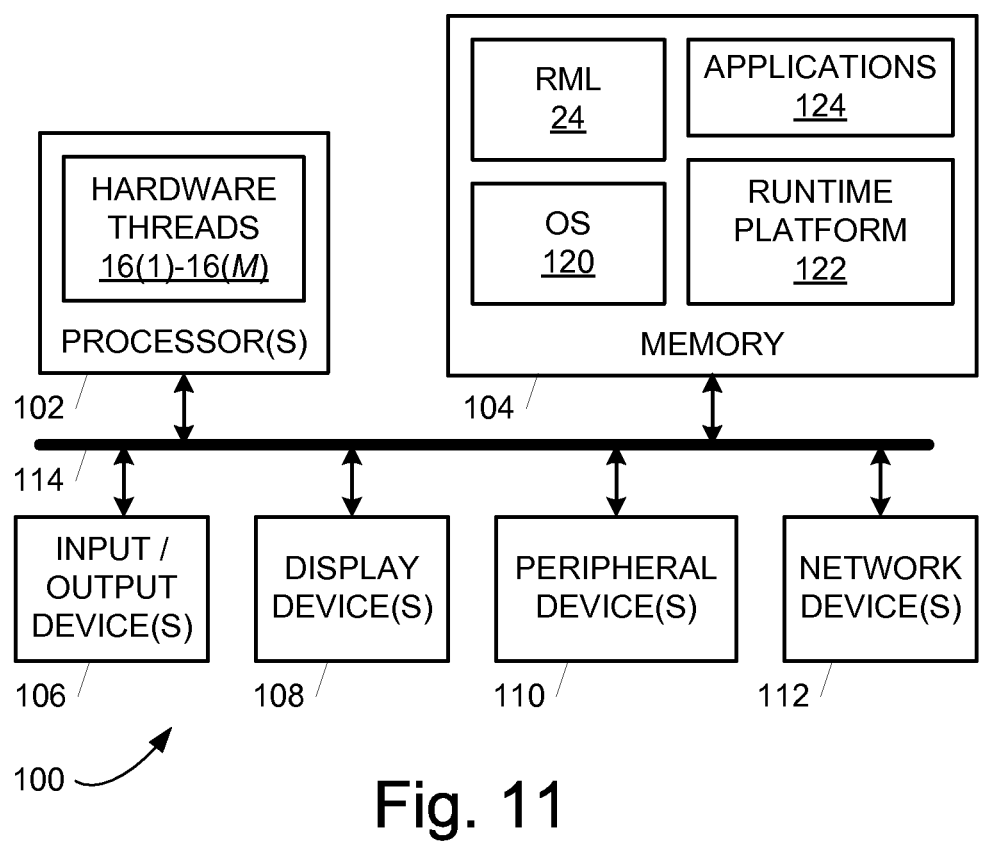
FIG. 11 is a block diagram illustrating an embodiment of a computer system configured to implement a runtime environment including a scheduler configured to schedule execution contexts for execution by processing resources.

FIG. 11 is a block diagram illustrating an embodiment of computer system 100 which is configured to implement runtime environment 10 including scheduler 22 where scheduler 22 is configured to schedule execution contexts for execution by processing resources as described above.

Computer system 100 includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each processor package 102 may include hardware threads 16 with the same or different architectures and/or instruction sets. For example, hardware threads 16 may include any combination of in-order execution cores, superscalar execution cores, and GPGPU execution cores. Each hardware thread 16 in processor packages 102 is configured to access and execute instructions stored in memory system 104. The instructions may include a basic input output system (BIOS) or firmware (not shown), OS 120, a runtime platform 122, applications 124, and resource management layer 14 (also shown in FIG. 1). Each hardware thread 16 may execute the instructions in conjunction with or in response to information received from input/output devices 106, display devices 108, peripheral devices 110, and/or network devices 112.

Computer system 100 boots and executes OS 120. OS 120 includes instructions executable by hardware threads 16 to manage the components of computer system 100 and provide a set of functions that allow applications 124 to access and use the components. In one embodiment, OS 120 is the Windows operating system. In other embodiments, OS 120 is another operating system suitable for use with computer system 100.

Resource management layer 14 includes instructions that are executable in conjunction with OS 120 to allocate resources of computer system 100 including hardware threads 16 as described above with reference to FIG. 1. Resource management layer 14 may be included in computer system 100 as a library of functions available to one or more applications 124 or as an integrated part of OS 120.

Runtime platform 122 includes instructions that are executable in conjunction with OS 120 and resource management layer 14 to generate runtime environment 10 and provide runtime functions to applications 124. These runtime functions include a scheduler function as described in additional detail above with reference to FIG. 1. The runtime functions may be included in computer system 100 as part of an application 124, as a library of functions available to one or more applications 124, or as an integrated part of OS 120 and or resource management layer 14.

Each application 124 includes instructions that are executable in conjunction with OS 120, resource management layer 14, and/or runtime platform 122 to cause desired operations to be performed by computer system 100. Each application 124 represents one or more processes, such as process 12 as described above, that may execute with scheduler 22 as provided by runtime platform 122.

Memory system 104 includes any suitable type, number, and configuration of volatile or non-volatile storage devices configured to store instructions and data. Memory system 104 may include any suitable cache hierarchy, be configured as a shared or distributed memory system, and may embody a locality scheme such as a non-uniform memory access (NUMA) scheme. In addition, memory system 104 may be configured as a single instruction stream multiple different memory store (SIMD) system, a multiple instruction stream multiple different memory store (MIMD) system, or a computer cluster coupled through a messaging protocol such as concurrent read, concurrent write (CRCW), concurrent read, exclusive write (CREW), or parallel random access machine (PRAM).

The storage devices of memory system 104 represent computer readable storage media that store computer-executable instructions including OS 120, resource management layer 14, runtime platform 122, and applications 124. The instructions are executable by computer system to perform the functions and methods of OS 120, resource management layer 14, runtime platform 122, and applications 124 described herein. Examples of storage devices in memory system 104 include hard disk drives, random access memory (RAM), read only memory (ROM), flash memory drives and cards, and magnetic and optical disks.

Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer readable storage medium, which is not a transitory propagating signal, storing computer-executable instructions that, when executed by a scheduler operating in a process of a computer system, perform a method comprising:
    scheduling tasks of a first task group for concurrent execution by multiple execution contexts on allocated processing resources of the computer system;
    identifying a first execution context to be bound to the first task group;
    binding the first execution context to the first task group;
    setting a cancel indicator in the first task group to identify the first task group as the task group to be cancelled by one of the multiple execution contexts other than the first execution context or an asynchronous error state;
    setting a cancel indicator in each of the multiple execution contexts that is executing tasks corresponding to the first task group, wherein execution contexts executing tasks corresponding to the first task group include:
        the first execution context bound to the first task group;
        execution contexts, other than the first execution context, executing or blocked on a task stolen from the first task group; and
        execution contexts, other than the first execution context, executing or blocked on a task descended from a task stolen from the first task group;
    maintaining a list in one of the first execution context and the first task group, the list is of execution contexts that stole tasks from the first task group bound to the first execution context; and
    after the identifying and setting, cancelling tasks in the first task group executing in each of the multiple execution contexts having its cancel indicator set including cancelling tasks in the first task group executing in the first execution context and any additional task groups created by a first one of the tasks of the first task group executing in the first execution context.

2. The computer readable storage medium of claim 1, the method further comprising:
    cancelling a second one of the tasks of the first task group executing in a second execution context and any additional task groups created by the second one of the tasks of the first task group executing in the second execution context.

3. The computer readable storage medium of claim 1, wherein the maintaining comprises:
    maintaining the list in the first execution context.

4. The computer readable storage medium of claim 1, wherein the maintaining comprises:
    maintaining the list in the first task group.

5. The computer readable storage medium of claim 1, the method further comprising:
    creating a local alias of the first task group for a second execution context; and
    cancelling the local alias in response to cancelling the first task group.

6. A method performed in a process executing on a computer system, the method comprising:
    creating a task group that includes a set of tasks suitable for concurrent execution in the process;
    scheduling tasks of the task group for concurrent execution by multiple execution contexts on allocated processing resources of the computer system;
    binding a first execution context to the task group;
    setting a cancel indicator in the task group to identify the task group as the task group to be cancelled by one of the multiple execution contexts other than the first execution context or an asynchronous error state; and
    after the creating and prior to completing execution of all of the tasks in the set of tasks of the task group, cancelling the task group, the cancelling comprising:
        setting a cancel indicator in each of the multiple execution contexts that is executing tasks corresponding to the task group, wherein execution contexts executing tasks corresponding to the task group include:
            the first execution context bound to the task group;

execution contexts, other than the first execution context, executing or blocked on a task stolen from the task group; and execution contexts, other than the first execution context, executing or blocked on a task descended from a task stolen from the task group;

maintaining a list in one of the first execution context and the task group, the list is of execution contexts that stole tasks from the task group bound to the first execution context; and cancelling tasks in the task group executing in each of the multiple execution contexts having its cancel indicator set.

7. The method of claim 6 further comprising:

executing the first one of the set of tasks of the task group with the first execution context;

executing a second one of the set of tasks of the task group with a second execution context; and cancelling the task group during the execution of the first and the second ones of the set of tasks.

8. The method of claim 7 further comprising:

stealing the second one of the set of tasks of the task group with the second execution context; and executing the second one of the set of tasks of the task group with the second execution context.

9. The method of claim 6 further comprising:

incrementing a counter in each execution context identified in the list of execution contexts that is bound to the task group in response to the task group being cancelled.

10. The method of claim 6 further comprising:

incrementing a counter in each execution context identified in the list in the task group in response to the task group being cancelled.

11. The method of claim 6 further comprising:

creating a local alias of the task group for a second execution context; and cancelling the local alias in response to cancelling the task group.

12. A computer readable storage medium, which is not a transitory propagating signal, storing computer-executable instructions that, when executed by a scheduler operating in a process of a computer system, perform a method comprising:

creating a task group with a first execution context bound to the task group, the task group including at least first and second tasks suitable for concurrent execution in the process;

scheduling tasks of the task group for concurrent execution by multiple execution contexts on allocated processing resources of the computer system;

setting a cancel indicator in the task group to identify the task group as the task group to be cancelled by one of the multiple execution contexts other than the first execution context or an asynchronous error state;

creating a local alias for the task group to be used in a second execution context which is a non-bound execution context;

using the local alias for the task group in the second execution context; and adding a third task from the second execution context to the local alias for the task group executing in the second execution context;

setting a cancel indicator in each of the multiple execution contexts that is executing tasks corresponding to the task group, wherein execution contexts executing tasks corresponding to the task group include:

the first execution context bound to the task group;

execution contexts, other than the first execution context, executing or blocked on a task stolen from the task group; and execution contexts, other than the first execution context, executing or blocked on a task descended from a task stolen from the task group;

maintaining a list in one of the first execution context and the task group, the list is of execution contexts that stole tasks from the task group bound to the first execution context; and cancelling tasks in the task group executing in each of the multiple execution contexts having its cancel indicator set.

13. The computer readable storage medium of claim 12, the method further comprising:

completing a join operation of the task group to join tasks in the task group including the third task, the join operation completing on the first execution context subsequent to the third task in the local alias for the task group completing executing on the second execution context.

14. The computer readable storage medium of claim 12, the method further comprising:

stealing the first task from the task group with the second execution context;

executing, with the second execution context, the first task stolen from the task group;

creating the local alias for the task group as an indirect alias; and storing a mapping between the task group and the indirect alias.

15. The computer readable storage medium of claim 12, the method further comprising:

creating the local alias for the task group as a direct alias; and forming a linked list that includes the direct alias and points back to the task group.

16. The computer readable storage medium of claim 15, the method further comprising:

completing a join operation on the task group subsequent to all tasks of the direct alias and any additional direct aliases of the linked list having execution completed.

17. The computer readable storage medium of claim 12, the method further comprising:

cancelling the local alias.

* * * * *